United States Patent
Gorce et al.

(10) Patent No.: US 10,268,196 B2
(45) Date of Patent: Apr. 23, 2019

(54) METHOD FOR CONTROLLING A TAXIING SYSTEM

(71) Applicant: SAFRAN LANDING SYSTEMS, Velizy Villacoublay (FR)

(72) Inventors: Clément Gorce, Velizy-Villacoublay (FR); Julien Marques, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 58 days.

(21) Appl. No.: 15/480,889

(22) Filed: Apr. 6, 2017

(65) Prior Publication Data
US 2017/0293300 A1    Oct. 12, 2017

(30) Foreign Application Priority Data
Apr. 7, 2016 (FR) ..................... 16 53058

(51) Int. Cl.
| | |
|---|---|
| *B64C 25/24* | (2006.01) |
| *G05D 1/00* | (2006.01) |
| *B64C 25/26* | (2006.01) |
| *B64C 25/34* | (2006.01) |
| *B64C 25/40* | (2006.01) |

(52) U.S. Cl.
CPC ........... *G05D 1/0083* (2013.01); *B64C 25/24* (2013.01); *B64C 25/26* (2013.01); *B64C 25/34* (2013.01); *B64C 25/405* (2013.01); *Y02T 50/823* (2013.01)

(58) Field of Classification Search
CPC ....... B64C 25/24; B64C 25/26; B64C 25/405; B64C 25/34; G05D 1/0083; Y02T 50/823
See application file for complete search history.

(56) References Cited

U.S. PATENT DOCUMENTS

| | | | | |
|---|---|---|---|---|
| 5,519,618 A | * | 5/1996 | Kastner | G01S 13/91 701/120 |
| 2009/0150009 A1 | * | 6/2009 | Villaume | G05D 1/0083 701/3 |
| 2012/0018574 A1 | | 1/2012 | Bayer | |
| 2015/0158579 A1 | | 6/2015 | Cox | |

(Continued)

FOREIGN PATENT DOCUMENTS

| | | |
|---|---|---|
| EP | 2 886 454 A1 | 6/2015 |
| WO | 2014/076485 A1 | 5/2014 |

OTHER PUBLICATIONS

Search Report for corresponding FR 1653058, dated Nov. 29, 2016.

*Primary Examiner* — Mussa A Shaawat
(74) *Attorney, Agent, or Firm* — Sughrue Mion, PLLC

(57) ABSTRACT

A method for controlling an aircraft taxiing system, comprising the steps of: generating a nominal load command (Comm_nom); generating an acceleration setpoint (Cons_a); implementing, in parallel with the generation of the nominal load command, a processing chain (7) comprising a regulation loop (Br), the regulation loop (Br) having for its setpoint the acceleration setpoint (Cons_a) and for its command an acceleration command (Comm_a), the acceleration command being converted into an acceleration load (Eff_a), a maximum load threshold being equal to the maximum of the acceleration load (Eff_a) and a minimum load threshold (Seuil_min); and generating an optimized load command (Comm_opt) equal to the minimum of the nominal load command and the maximum load threshold.

9 Claims, 3 Drawing Sheets

(56) References Cited

U.S. PATENT DOCUMENTS

| | | |
|---|---|---|
| 2015/0175257 A1 | 6/2015 | Gorce et al. |
| 2015/0210383 A1 | 7/2015 | De Mers et al. |
| 2015/0225075 A1 | 8/2015 | Renier et al. |
| 2015/0253773 A1 | 9/2015 | Cox et al. |
| 2015/0298817 A1* | 10/2015 | Jackson ................ B64D 45/00 701/3 |
| 2016/0086396 A1* | 3/2016 | Nutaro ................ G07C 5/0808 701/29.4 |
| 2016/0122007 A1* | 5/2016 | Cox ...................... B64C 25/405 701/3 |

* cited by examiner

METHOD FOR CONTROLLING A TAXIING SYSTEM

The invention relates to the field of aircraft taxiing or rolling.

BACKGROUND OF THE INVENTION

A taxiing system installed on an aircraft makes it possible to move the aircraft during the taxiing phases autonomously, that is to say avoiding the use of the main engines of the aircraft.

In an electric taxiing system, wheels borne by one or more landing gears are driven in rotation, during the taxiing phases, by actuators comprising electric motors.

In the taxiing phases of an aircraft using such a taxiing system, the aircraft is therefore moved by the landing gear or gears bearing the wheels driven in rotation by the taxiing system. The landing gears are therefore subjected to loads opposing the loads they are normally subjected to when it is the aircraft which, by virtue of the main engines, pulls the landing gears.

The loads to which the landing gears are subjected during the taxiing phases generate mechanical stresses (for example, flexural or torsional stresses), but also thermal stresses, on mechanical parts of the taxiing system and, more generally, on mechanical parts of the landing gears. The rods slidingly mounted in the caissons of the landing gears are thus particularly affected by the effects of these mechanical and thermal stresses.

Because of these mechanical and thermal stresses, the mechanical parts of the taxiing system and of the landing gears are subjected to a fatigue which reduces the life of said mechanical parts.

OBJECT OF THE INVENTION

One aim of the invention is to increase the life of the mechanical parts of an aircraft taxiing system and of the landing gears of the aircraft.

SUMMARY OF THE INVENTION

To this end, there is provided, according to the invention, a method for controlling a taxiing system suitable for moving an aircraft during the taxiing of the aircraft, comprising the steps of:
  generating a nominal load command;
  generating an acceleration setpoint;
  implementing, in parallel with the generation of the nominal load command, a processing chain intended to define a maximum load threshold and comprising a regulation loop, the regulation loop having for its setpoint the acceleration setpoint and for its command an acceleration command, the acceleration command being converted into an acceleration load making it possible to obtain an acceleration of the aircraft during the taxiing equal to the acceleration command, the maximum load threshold being equal to the maximum of the acceleration load and a minimum load threshold;
  generating an optimised load command equal to the minimum of the nominal load command and the maximum load threshold.

The optimised load command makes it possible to limit the stresses applied to the mechanical parts of the taxiing system and landing gears of the aircraft bearing wheels used for the taxiing, and therefore increase the life of these mechanical parts.

Other features and advantages of the invention will emerge on reading the following description of nonlimiting particular embodiments of the invention.

BRIEF DESCRIPTION OF THE DRAWINGS

Reference will be made to the attached drawings, in which.

DETAILED DESCRIPTION OF THE INVENTION

Figure 1:
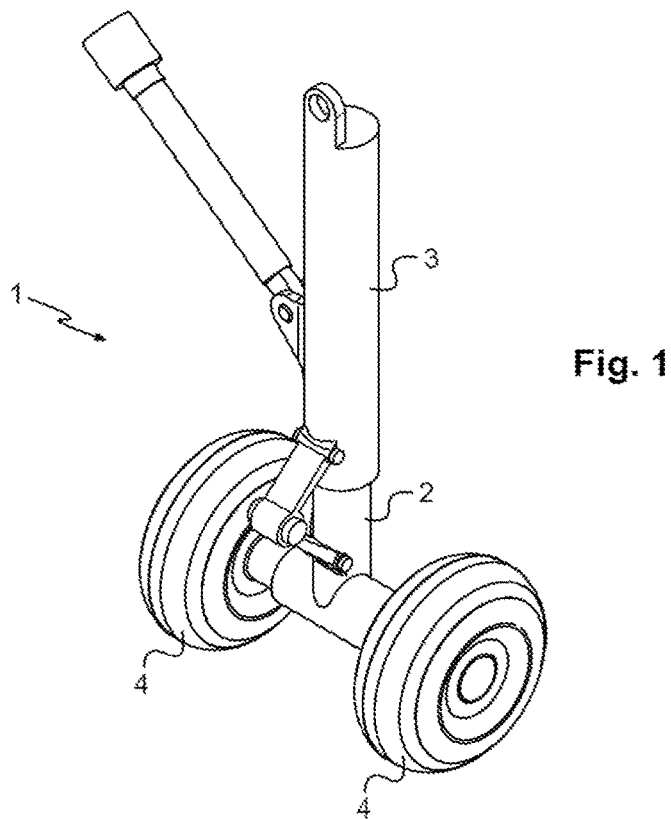
FIG. 1 represents a landing gear of an aircraft bearing wheels used for the taxiing of the aircraft.

Referring to FIG. 1, the method for controlling a taxiing system according to a first embodiment of the invention is here implemented on an aircraft comprising a landing gear 1.

The landing gear 1 comprises a rod 2 slidingly mounted in a caisson 3 of the landing gear 1 and bearing two wheels 4.

The taxiing system acts on the wheels 4 of the landing gear 1 to move the aircraft autonomously during the taxiing of the aircraft.

The taxiing system here comprises an actuator comprising an electric motor, a power electrical module (also called computer, controller, power electronics, etc.) and an electrical control module (also called computer, controller, control electronics, etc.). The power electrical module and the electrical control module can of course be incorporated in one and the same electrical unit.

The pilot of the aircraft generates a taxiing command to move the aircraft (along a certain line, in a certain direction, with a certain speed, a certain acceleration, etc.). The electrical control module generates, from the taxiing command, a load command (for example, a torque or speed or load command) intended for the power electrical module. The power electrical module generates, from the load command, a control electrical current and transmits it to the electric motor.

The method for controlling a taxiing system according to the first embodiment is here implemented in the electrical control module and aims to generate a reduced effective load command making it possible to reduce the loads applied to the mechanical parts of the landing gear 1 and of the taxiing system during the taxiing of the aircraft.

Figure 2:
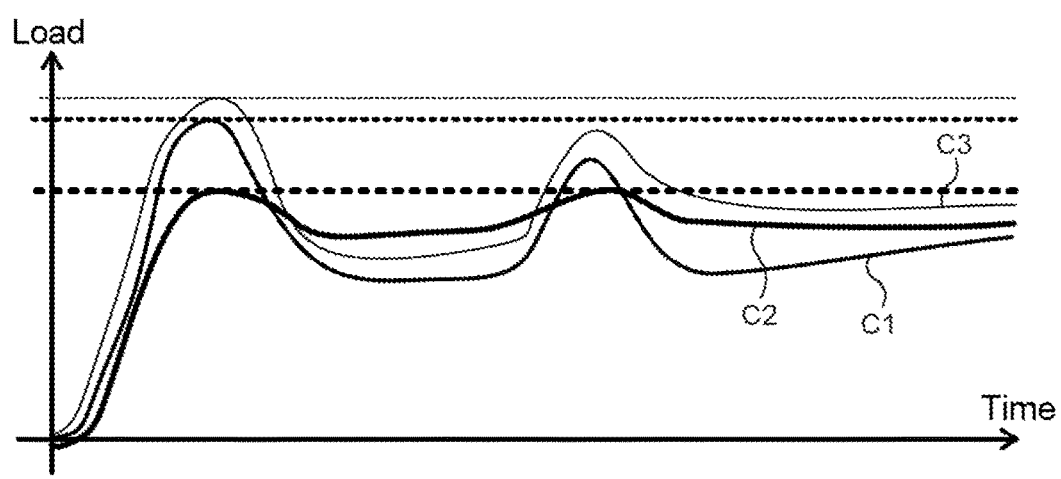
FIG. 2 comprises a graph on which are represented curves of effective load commands.

Referring to FIG. 2, the method for controlling a taxiing system according to the first embodiment therefore aims to obtain an effective load command typically close to the curves C1 and C2 (depending on the trade-off selected between mechanical stresses and thermal stresses), while a control method of the prior art produces an effective load command typically close to the curve C3.

The effective load command is generated by the control method from input signals produced from the taxiing command generated by the pilot of the aircraft and from an acceleration setpoint produced in the electrical control module.

Figure 3:
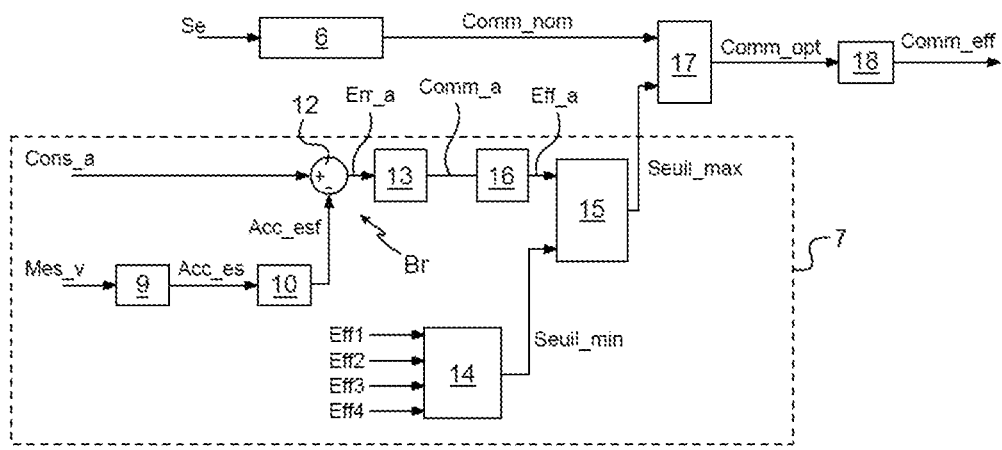
FIG. 3 represents an aircraft taxiing method according to a first embodiment of the invention.

Referring to FIG. 3, the control method first comprises the implementation of a nominal load control block 6. The nominal load control block 6 receives the input signals Se. The nominal load control block 6 generates a nominal load command Comm_nom as a function of the input signals Se. The nominal load command Comm_nom is intended to drive the electric motor of the actuator of the taxiing system.

The nominal load command Comm_nom generated by the nominal load control block 6 is a conventional load command, as generated by a method for controlling a taxiing system of the prior art. The nominal load control block 6 is not therefore described here in more detail.

The control method also comprises the implementation of a processing chain 7 in parallel with the implementation of the nominal load control block 6.

The processing chain 7 comprises a regulation loop Br intended to regulate the acceleration of the aircraft.

The regulation loop Br has for its setpoint the acceleration setpoint Cons_a described earlier. The acceleration setpoint Cons_a is, here, a predetermined constant equal to 0.4 m/s². The value of the acceleration setpoint Cons_a is a value which makes it possible to limit the stresses exerted on the different mechanical parts of the landing gear 1 and of the taxiing system. Note that it would be perfectly possible to use an acceleration constant Cons_a with a value that would be defined in real time as a function of various measurements or estimations to optimise the limitation of the stresses.

The processing chain 7 also receives measurements of speed Mes_v of the aircraft during the taxiing of the aircraft and performed by one or more aircraft speed sensors.

The measurements of speed Mes_v of the aircraft are used by the regulation loop Br to regulate the acceleration of the aircraft. The regulation loop Br comprises a derivation block 9 which receives the speed measurements Mes_v and transforms the speed measurements Mes_v into an estimated acceleration Acc_es of the aircraft during the taxiing of the aircraft. The derivation block 9 implements an algorithm for differentiating the speed measurements Mes_v. This differentiation algorithm aims to minimise the computation noise resulting from inaccuracies in the models used in the processing chain 7, and thus improves the performance levels of the processing chain 7.

The regulation loop Br also comprises a processing and filtering block 10, at the output of the derivation block 9, which makes it possible to filter the estimated acceleration Acc_es at the output of the derivation block 9 to reduce the noise present in the estimated acceleration Acc_es (or, more specifically, in the signal representative of the estimated acceleration Acc_es). This noise results from the influence, in the implementation of the differentiation algorithm, of the sampling and of the resolving of the speed measurements Mes_v, of mechanical or electrical disturbances, of measurement inaccuracies, etc. The processing and filtering block 10 produces a filtered estimated acceleration Acc_esf.

The regulation loop Br also comprises a subtractor 12, which subtracts from the acceleration setpoint Cons_a the filtered estimated acceleration Acc_esf. The subtractor 12 thus produces an acceleration error Err_a of the regulation loop Br, which is equal to the difference between the acceleration setpoint Cons_a and the filtered estimated acceleration Acc_esf.

The regulation loop Br also comprises a regulator of proportional, integral, derivative 13 type (commonly called PID regulator). The PID regulator 13 generates an acceleration command Comm_a from the acceleration error Err_a.

The PID regulator 13 here has the transfer function:

$$PID(p)=Kp^{*}(1+1/(Ti^{*}p)+Td^{*}p/(1+(td/N)^{*}p)).$$

The PID regulator 13 implements an anti wind-up function.

The acceleration command Comm_a at the output of the regulation loop Br is converted by a conversion block 16 into an acceleration load Eff_a making it possible to obtain an acceleration of the aircraft during the taxiing equal to the acceleration command (Comm_a).

Note that the value of overshoot of the acceleration command Comm_a relative to the acceleration setpoint Cons_a is, here, a critical parameter for designing the regulation loop Br (and therefore the PID regulator 13). By ensuring that the overshoot does not exceed a certain threshold, the application of an acceleration load peak Eff_a on the landing gear 1 is avoided, when such an acceleration load peak Eff_a is not necessary for the good taxiing performance levels (see FIG. 2 curve C2).

The static error of the regulation loop Br, for its part, can be offset by a modification of the acceleration setpoint Cons_a, and does not therefore constitute a critical parameter for designing the regulation loop Br (and therefore the PID regulator 13).

The acceleration command Comm_a must be as low as possible to reduce the acceleration load Eff_a as much as possible. The lower the acceleration command Comm_a, the more reduced the acceleration load Eff_a, and the greater the increase in the life of the landing gear 1. It is however of course advisable to not significantly reduce the taxiing performance levels.

The processing chain 7 also comprises a minimum load computation block 14.

The minimum load computation block 14 is used to compute a minimum load threshold Seuil_min, which corresponds to a load necessary to set the aircraft in motion (if the latter is stopped) or to maintain the speed of the aircraft (if the latter is rolling).

The minimum load threshold Seuil_min therefore corresponds to the minimum load that should be maintained on the landing gear of the aircraft so as not to significantly penalize the taxiing performance levels if there is no need to do so in light of the stresses and fatigue levels to which the landing gear 1 is subjected.

The minimum load threshold Seuil_min is computed in real time (that is to say using measurements or estimations performed in real time) from the sum of first resisting loads Eff1, of second resisting loads Eff2, of third resisting loads Eff3 and of fourth resisting loads Eff4 which are applied to the aircraft. Note here that only some loads out of the first resisting loads Eff1, the second resisting loads Eff2, the third resisting loads Eff3 and the fourth resisting loads Eff4 could be taken into account to implement the control method of the invention. The following paragraphs give an example of computation of each of these loads.

The first resisting loads Eff1 are due to gravity. The first resisting loads Eff1 are determined as a function of at least one of the following parameters: weight of the aircraft, local or overall slope of a runway on which the aircraft is rolling, at least one geometrical characteristic of the aircraft.

The first resisting loads Eff1 can be computed using the following formula:

$$\text{Eff1} = F\text{overall gravity} = M*g*\sin(\theta pg),$$

where M is the weight of the aircraft, g is the acceleration of gravity, $\theta pg$ is the overall slope.

Thus, by using the following numeric values:
M=80000 kg;
g=9.81 m/s$^2$;
$\theta pg$=1°;
the following is obtained:
Eff1=Foverall gravity≈80000*9.81*sin(1)≈13697N.

The first resisting loads Eff1 can alternatively be computed using the following formula:

$$\text{Eff1} = F\text{local gravity} = Ch*\sin(\theta pl),$$

where $\theta pl$ is the local slope and where Ch is a load computed as a function of the weight of the aircraft and of geometrical characteristics of the aircraft, including the number of landing gears of the aircraft and the distance and the orientation of each landing gear relative to the centre of gravity of the aircraft.

The second resisting loads Eff2 are due to aerodynamic effects.

The second resisting loads Eff2 are determined as a function of at least one of the following parameters: speed of the aircraft, active drag surface, drag coefficient, aircraft lift coefficient (in all directions), surrounding air speed, surrounding air density.

The second resisting loads Eff2 can be computed using the following formula:

$$\text{Eff2} = F\text{air} = 0.5*\rho*S*Ct*(V\text{aircraft} + V\text{air})^2,$$

where $\rho$ is the surrounding air density, S is the active drag surface, Ct is the drag coefficient, Vaircraft is the speed of the aircraft and Vair is the surrounding air speed.

Thus, by using the following numeric values:
$\rho$=1.204 kg/m$^3$;
S=100 m$^2$;
C=0.007;
Vaircraft=10 kts (i.e. 5.144 m/s);
Vair air=0 m/s (stable air);
the following is obtained:

$$\text{Eff2} = F\text{air} = 112N.$$

The third resisting loads Eff3 are due to the tyres of the aircraft and to a link to the ground between the tyres of the aircraft and the runway on which the aircraft is rolling during the taxiing of the aircraft.

The third resisting loads Eff3 are determined as a function of at least one of the following parameters: at least one characteristic of the tyres of the aircraft, load experienced by each tyre, parking time of the aircraft (if the aircraft is stopped), at least one characteristic of the ground of the runway.

The characteristics of the tyres here comprise the number of tyres, the type of the tyres, the pressure of the tyres, the temperature of the tyres, the orientation of the tyres relative to the landing gears which bear the wheels provided with said tyres.

The characteristics of the ground of the runway here comprise mechanical characteristics, indentation characteristics, ground temperature, ground type (concrete, bituminous, etc.).

The third resisting loads Eff3 can be computed, when the aircraft is moving, by using the following formula:

$$\text{Eff3} = F\text{tyre} = F\text{rolling} = M*g*Cr,$$

where Cr is the rolling resistance coefficient which is computed as a function of the parameters listed above.

Thus, with:
M=80000 kg;
g=9.81 m/s$^2$;
Cr=0.001;
the following is obtained:

$$\text{Eff3} = F\text{rolling} = F\text{tyre} = 7848N.$$

The third resisting loads Eff3 can be computed, when the aircraft is stopped, by using the following formula:

$$\text{Eff3} = F\text{tyre} = M*g*(A - B*\exp^{D/C}),$$

where A, B, C are coefficients computed as a function of the parameters listed above and where D is the parking time of the aircraft.

Thus, with:
M=80000 kg;
g=9.81 m/s$^2$;
D=120 minutes;
A=0.05;
B=0.0025,
C=60;
the following is obtained:

$$\text{Eff3} = F\text{tyre} = 24743 \ N.$$

The fourth resisting loads Eff4 are due to the rotating parts of the aircraft other than the wheels.

The fourth resisting loads Eff4 are determined as a function of at least one of the following parameters: at least one characteristic of the rolling or other bearings of the rotating parts, speed experienced by the rolling or other bearings, load applied by the rolling or other bearings, friction between the rotating parts.

The fourth resisting loads Eff4 can be computed by using the following formula:

$$\text{Eff4} = F\text{rotating parts} = Cf*Vr,$$

where Cf is a friction coefficient dependent on the parameters listed above and Vr is a rotation speed of the rotating parts.

Thus, with:
Cf=50;
Vr=20 rad/s;
the following is obtained:

$$\text{Eff4} = F\text{rotating parts} = 1000N.$$

The minimum load computation block 14 computes the minimum load threshold Seuil_min by adding together the first resisting loads Eff1, the second resisting loads Eff2, the third resisting loads Eff3 and the fourth resisting loads Eff4, and by adding a load margin. The load margin is either a fixed margin, or a percentage of the sum of the resisting loads.

Thus, with a fixed margin of 150N, there is obtained, for an aircraft in motion, a minimum load threshold Seuil_min:

$$\text{Seuil\_min} = 13697 + 112 + 7848 + 1000 + 150 = 22807N.$$

With a margin equal to 10% of the sum of the resisting loads, there is obtained, for an aircraft in motion, a minimum load threshold Seuil_min:

$$\text{Seuil\_min} = (13697 + 112 + 7848 + 1000) \ast (1 + 10\%)$$
$$= 24923N.$$

The processing chain 7 also comprises a maximum load selection block 15 which determines a maximum load threshold Seuil_max equal to the maximum of the acceleration load Eff_a and the minimum load threshold Seuil_min.

According to the standard used for the sign of the load values and according to the direction of movement of the aircraft while taxiing, the acceleration load Eff_a and the minimum load threshold Seuil_min can both be positive or negative. The maximum load selection block 15 selects the maximum in absolute value out of the acceleration load Eff_a and the minimum load threshold Seuil_min and retains the sign of the acceleration load Eff_a if the latter is selected or of the minimum load threshold Seuil_min if the latter is selected.

Thus, if the acceleration load Eff_a is equal to 15000N and the minimum load threshold Seuil_min to 20000N (or vice versa), the maximum load threshold Seuil_max is equal to 20000N. If the acceleration load Eff_a is equal to −15000N and the minimum load threshold Seuil_min to −20000N, the maximum load threshold Seuil_max is equal to −20000N.

Figure 4:
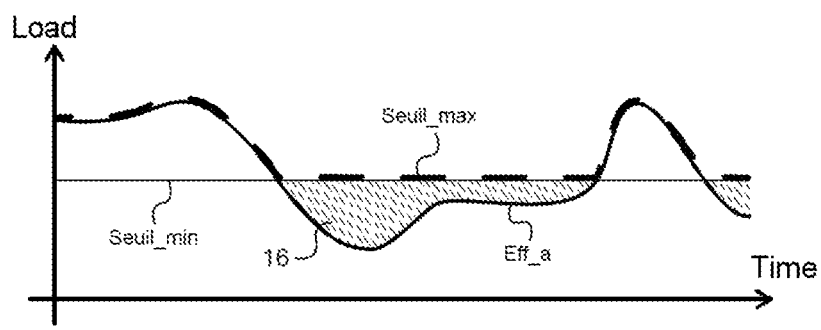
FIG. 4 comprises a graph on which are represented a curve of an acceleration load, a curve of a minimum load threshold and a curve of a maximum load threshold.

The principle of the determination of the maximum load threshold Seuil_max by the maximum load selection block 15 is illustrated in FIG. 4. The shaded area 16 corresponds to a load which makes it possible to improve the taxiing performance levels by increasing the acceleration, while maintaining an acceptable load level so as not to excessively strain the mechanical parts of the taxiing system and of the landing gear 1.

The maximum load selection block 15 therefore produces a maximum load threshold Seuil_max which makes it possible to optimise the life of the mechanical parts of the taxiing system and of the landing gear 1 by reducing the stresses and the fatigue levels to which the mechanical parts of the aircraft taxiing system and of the landing gear 1 are subjected. By selecting the maximum of the acceleration load Eff_a and the minimum load threshold Seuil_min, any penalizing of the taxiing performance levels is however avoided if that is not necessary in light of the stresses and the fatigue levels to which the landing gear 1 has been subjected.

The method for controlling the taxiing system also comprises the implementation of a minimum load selection block 17 which generates an optimised load command Comm_opt by selecting the minimum of the nominal load command Comm_nom and the maximum load threshold Seuil_max.

The selection made by the minimum load selection block 17 is made in a way similar to the selection made by the maximum load selection block 15—if it is only the minimum in absolute value which is selected.

Thus, if the nominal load command Comm_nom is equal to 15000N and the maximum load threshold Seuil_max to 20000N (or vice versa), the optimised load command Comm_opt is equal to 15000N. If the nominal load command Comm_nom is equal to −15000N and the maximum load threshold Seuil_max to −20000N (or vice versa), the optimised load command Comm_opt is equal to −15000N.

Figure 5:
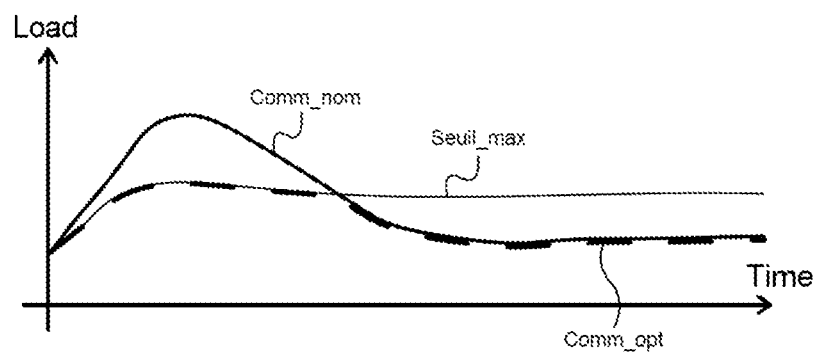
FIG. 5 comprises a graph on which are represented a curve of a nominal load command, a curve of an optimised load command and a curve of a maximum load threshold.

The principle of the determination of the optimised load command Comm_opt by the minimum load selection block 17 is illustrated in FIG. 5.

The implementation of the minimum load selection block 17 constitutes a protection device which makes it possible to incorporate the processing chain 7 in a method for controlling a taxiing system of the prior art while retaining the conditions of implementation and the sampling times of this method for controlling a taxiing system of the prior art.

Thus, the optimised load command Comm_opt does not systematically correspond to the maximum load threshold Seuil_max produced by the maximum load selection block 15 to optimise the life of the landing gear by reducing the stresses and the fatigue levels to which it is subjected. In particular, when the power developed by the electric motor is low (because it is limited, or else because of the command), the acceleration of the aircraft is low and the optimisation of the life is not used.

The method for controlling the taxiing system also comprises the implementation of a load management block 18 which transforms the optimised load command Comm_opt into an effective load command Comm_eff which is used to drive the electric motor.

The load management block 18 produces, if necessary, limitations (saturation, slope limitation, etc.), adjustments to make the effective load command Comm_eff conform to the standards used (sign, unit, etc.), or else implements a switchover between multiple control methods. Obviously, it is possible for the load management block 18 not to perform any operation, and therefore for the optimised load command Comm_opt to be equal to the effective load command Comm_eff.

Figure 6:
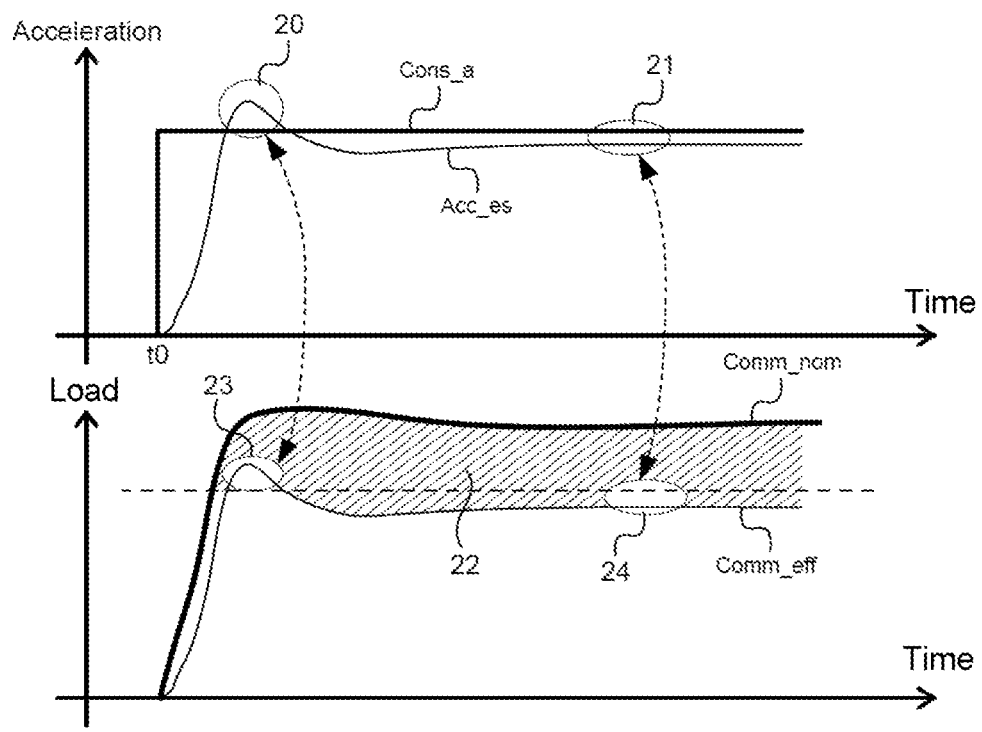
FIG. 6 comprises a first graph on which are represented a curve of an acceleration setpoint and a curve of an estimated acceleration, and a second graph on which are represented a curve of a nominal load command and a curve of an effective load command.

The implementation of the method for controlling a taxiing system according to the first embodiment of the invention is now illustrated with reference to FIG. 6.

When the taxiing of the aircraft begins at the moment t0, the acceleration setpoint Cons_a has a constant value. The estimated acceleration Acc_es exhibits an acceleration overshoot 20 and a static acceleration error 21.

The nominal load command Comm_nom is relatively high. The control method makes it possible to produce an effective load command Comme_ff significantly lower than the nominal load command Comm_nom. The shaded area 22 represents the gain in terms of load which makes it possible to reduce the stresses on the mechanical parts of the taxiing system and of the landing gear 1.

Note that the acceleration overshoot 20 generates a limited and acceptable load overshoot 23. The static load error 24 is also acceptable. It could even be reduced by acting on the acceleration setpoint Cons_a.

The main requirements to be observed for dimensioning the control method according to the first embodiment of the invention are to ensure the stability of the processing chain 7 and of the method overall, to minimise the overshoot as much as possible (and cancel it if possible), to adapt the acceleration setpoint Cons_a and the response time at the lowest acceptable taxiing performance levels, and to define an acceleration setpoint Cons_a which makes it possible to compensate the static error.

Note here that if the acceleration setpoint Cons_a cannot be achieved (for example because the electrical power available for the taxiing system does not make it possible to compensate the weight of the aircraft or the slope of the runway), the processing chain 7 does not modify the behaviour of the control method according to the first embodiment of the invention. In effect, the control method in this case authorizes the generation of increasingly higher loads, until the acceleration setpoint Cons_a is reached.

Note also that the processing chain 7 of the method for controlling a taxiing system according to the first embodiment of the invention can be incorporated into a control method of the prior art regardless of the load used for the load command (torque, speed, load, etc.), and do so without it being necessary to change the interfaces used by the control method of the prior art. The taxiing command produced by the pilot of the aircraft and the input signals remain the same.

Figure 7:
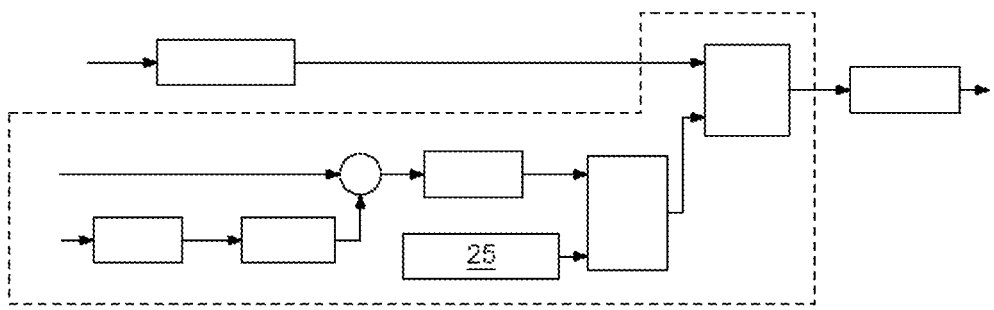
FIG. 7 represents an aircraft taxiing method according to a second embodiment of the invention.

Referring to FIG. 7, the method for controlling a taxiing system according to a second embodiment of the invention is similar to the method for controlling a taxiing system according to the first embodiment of the invention, except that the minimum load computation block 25 of the method for controlling a taxiing system according to the second embodiment of the invention is different from the minimum load computation block 14.

The minimum load threshold Seuil_min produced by the minimum load computation block 25 is a predetermined constant threshold.

The predetermined constant threshold is here defined by studies and analyses relating only to the mechanical parts of the landing gear 1 itself (and not the mechanical parts of the taxiing system). The implementation of the method for controlling a taxiing system according to the second embodiment of the invention requires fewer resources, because the minimum load threshold Seuil_min is no longer computed in real time, and is optimised in relation only to the mechanical parts of the landing gear and not to the mechanical parts of the taxiing system.

The minimum load threshold Seuil_min is, here, equal to 25000N (the threshold corresponds in this case to all the main landing gears). When the load to which the landing gears 1 are subjected is lower than 25000N during 80% of the taxiing phases (which corresponds to the percentage of all of the taxiing phases during which the minimum load threshold Seuil_min is used to define the effective load command), the life of the landing gear is increased by 70%.

Of course, the invention is not limited to the embodiments described but encompasses any variant falling within the scope of the invention as defined by the claims.

In particular, the numeric values used in the description are provided only to illustrate the invention and can of course be different upon the implementation of the invention.

The invention claimed is:

1. A method for controlling a taxiing system suitable for moving an aircraft during the taxiing of the aircraft, the aircraft comprising a landing gear, the taxiing system comprising an electrical control module, a power electrical module, and an actuator comprising an electric motor, the method comprising:
   the electrical control module generates, from a taxiing command generated by the pilot of the aircraft, a nominal load command (Comm_nom);
   the electrical control module generates an acceleration setpoint (Cons_a);
   implementing, in the electrical control module, in parallel with the generation of the nominal load command, a processing chain (7) intended to define a maximum load threshold (Seuil_max) and comprising a regulation loop (Br), the regulation loop (Br) having for its setpoint the acceleration setpoint (Cons_a) and for its command an acceleration command (Comm_a), the acceleration command being converted into an acceleration load (Eff_a) making it possible to obtain an acceleration of the aircraft during the taxiing equal to the acceleration command (Comm_a), the maximum load threshold being equal to the maximum of the acceleration load (Eff_a) and a minimum load threshold (Seuil_min);
   generating in the electrical control module an optimised load command (Comm_opt) equal to the minimum of the nominal load command and the maximum load threshold; and
   generating in the electrical control module an effective load command from the optimized load command,
   wherein the effective load command is input to the power electrical module, which generates, from the effective load command, a control electrical current and transmits it to the electrical motor, and
   wherein the effective load command effects reducing the loads applied to the mechanical parts of the landing gear and of the taxiing system during the taxiing of the aircraft.

2. The control method according to claim 1, in which the minimum load threshold is a predetermined constant threshold.

3. The control method according to claim 1, in which the minimum load threshold is computed in real time as a function of resisting loads applied to the aircraft during the taxiing of the aircraft.

4. The control method according to claim 3, in which the resisting loads comprise loads out of the first resisting loads (Eff1) due to gravity, the second resisting loads (Eff2) due to aero dynamic effects, third resisting loads (Eff3) due to the tyres of the aircraft and to a link to the ground between the tyres and a runway on which the aircraft is rolling during the taxiing of the aircraft, fourth resisting loads (Eff4) due to rotating parts of the aircraft.

5. The control method according to claim 4, in which the first resisting loads (Eff1) are determined as a function of at least one of the following parameters: weight of the aircraft, local or overall slope of a runway on which the aircraft is rolling, at least one geometrical characteristic of the aircraft.

6. The control method according to claim 4, in which the second resisting loads (Eff2) are determined as a function of at least one of the following parameters: speed of the aircraft, active drag surface, drag coefficient, aircraft lift coefficient, surrounding air speed, surrounding air density.

7. The control method according to claim 4, in which the third resisting loads (Eff3) are determined as a function of at least one of the following parameters: at least one characteristic of the tyres of the aircraft, load experienced by each tyre, parking time of the aircraft, at least one characteristic of the ground of the runway.

8. The control method according to claim 4, in which the fourth resisting loads (Eff4) are determined as a function of at least one of the following parameters: at least one characteristic of the rolling and other bearings of rotating parts of the aircraft, speed experienced by the rolling or other bearings, load applied by the rolling or other bearings, friction between the rotating parts.

9. The control method according to claim 1, in which the regulation loop (Br) comprises a regulator of proportional, integral, derivative (13) type.

* * * * *